United States Patent
Song et al.

(10) Patent No.: US 7,330,654 B2
(45) Date of Patent: Feb. 12, 2008

(54) ETHERNET PASSIVE OPTICAL NETWORK AND POINT-TO-POINT EMULATION METHOD

(75) Inventors: Jae-Youn Song, Seoul (KR); Min-Hyo Lee, Suwon-shi (KR); A-Jung Kim, Seoul (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 662 days.

(21) Appl. No.: 10/406,468

(22) Filed: Apr. 3, 2003

(65) Prior Publication Data

US 2003/0190168 A1  Oct. 9, 2003

(30) Foreign Application Priority Data

Apr. 3, 2002 (KR) .................. 10-2002-0018267
Apr. 30, 2002 (KR) .................. 10-2002-0023824

(51) Int. Cl.
  *H04J 14/00* (2006.01)
  *H04J 3/26* (2006.01)
  *H04B 10/00* (2006.01)
  *H04L 12/56* (2006.01)

(52) U.S. Cl. ............................ 398/71; 398/70; 398/66; 398/168; 370/395.3; 370/420; 370/432

(58) Field of Classification Search .................. 398/72, 398/71, 70, 66, 168; 370/395.3, 395.31, 370/395.53, 397, 399, 420, 421, 432, 442
See application file for complete search history.

(56) References Cited

U.S. PATENT DOCUMENTS 6,650,480 B2 * 11/2003 Tanaka ....................... 359/618

6,996,124 B1 * 2/2006 Chow ......................... 370/466

(Continued)

OTHER PUBLICATIONS

EPON-P2P Emulation and Downstream Broadcast Baseline Proposal, IEEE 902.3 EFM Task Force, online, Mar. 2002, pp. 1-10 to Suzuki et al.*

(Continued)

*Primary Examiner*—M. R. Sedighian
(74) *Attorney, Agent, or Firm*—Cha & Reiter, LLC

(57) ABSTRACT

Disclosed is a point-to-point emulation method for operating an Ethernet passive optical network having an optical line terminal (OLT) and a plurality of optical network units (ONUs) each connected to the OLT. A tag Ethernet frame transmitted between the OLT and the ONUs includes a destination address (DA) field representing a destination address, a source address (SA) field representing a source address, and an LLID field in which a unique LLID assigned to an object of the ONU side is recorded. The LLIDs are assigned to ports of a bridge or an L2 (Layer 2) switch of the OLT side on a one-to-one basis. The OLT, upon receiving a tag Ethernet frame, outputs an LLID field-deleted Ethernet frame to the bridge or L2 switch port to which an LLID in the received frame is assigned. The bridge or the L2 switch transmits the Ethernet frame to a port to which a previously learned destination address is assigned. The OLT regenerates a tag Ethernet frame by inserting into the Ethernet frame an LLID field in which an LLID of the destination ONU is recorded. The regenerated tag Ethernet frame is transmitted to the destination ONU.

18 Claims, 9 Drawing Sheets

U.S. PATENT DOCUMENTS

2002/0063932 A1*  5/2002  Unitt et al. .................. 359/168
2003/0007211 A1*  1/2003  Gummalla et al. .......... 359/136
2003/0117998 A1*  6/2003  Sala et al. ................... 370/351

OTHER PUBLICATIONS

Ajay. Gummalla, "EPON Compliance Architecture", IEEE 802.3 EFM Task Force, Jan. 2002, pp. 1, 3, 5, 7, 9, 11.

Hiroshi Suzuki et al, "EPON-P2P Emulation and Downstream Broadcast-Baseline Proposal", IEEE 802.3 EFM Task Force, Online, Mar. 2002, pp. 1-10.

Yukihiro Fujimoto et al., "Layering of Point to Point Emulation", IEEE 802.3 EFM Task Force, Online, Nov. 2001, pp. 1,3,5,7,9, 11, 13, 15, 17, 19, 21 and 23.

Tony Anderson et al., "MPCP Auto Discorvery Baseline Proposal", IEEE 802.3 EFM Task Force, Online, Mar. 2002, pp. 1, 3, 5, 7,9,11, 13, and 15.

Bruce Tolley, "Ethernet in the First Mile-Setting the Standard for Fast Broadband Access", Cisco Systems-White Paper, Online, 2001, pp. 1,3,5,7,9, and 11.

* cited by examiner

| PACKET | | | | | | | |
|---|---|---|---|---|---|---|---|
| ADDED BY TRANSMITTER, STRIPPED BY RECEIVER | DATA FRAME (SENT BY USER) | | | | | | ADDED BY TRANSMITTER (OPTION) |
| | DATA FRAME (DELIVERED TO USER, BUT CRC IS OPTIONALLY STRIPPED BY RECEIVER) | | | | | | |
| PREAMBLE | SFD | DESTINATION ADDRESS | SOURCE ADDRESS | TYPE | LLC DATA | PAD | CRC |
| 7BYTES | 1 | 6BYTES | 6BYTES | 2 | 0~1500 | 0~46 | 4BYTES |
| | | | | HIGH / LOW | ... | ... MSB | LSB |

FIG.3
(PRIOR ART)

| DESTINATION ADDRESS(6BYTE) /210 | SOURCE ADDRESS(6BYTE) /220 | ETYPE /230 | LLID /240 | LEN/ETYPE (2BYTE) /250 | DATA /260 | FCS /270 |
|---|---|---|---|---|---|---|

FIG.4

ETHERNET PASSIVE OPTICAL NETWORK AND POINT-TO-POINT EMULATION METHOD

CLAIM OF PRIORITY

This application claims priority under 35 U.S.C. § 119 to an application entitled, "Ethernet—Passive Optical Network and Point-to-Point Emulation Method", filed in the Korean Industrial Property Office on Apr. 3, 2002 and assigned Ser. No. 2002-18267, and an application entitled "Ethernet—Passive Optical Network and Point-to-Point Emulation Method" filed in the Korean Intellectual Property Office on Apr. 30, 2002 and assigned Ser. No. 2002-23824, the contents of both being incorporated herein by reference.

BACKGROUND OF THE INVENTION

1. Field of the Invention

The present invention relates generally to an optical network, and in particular, to an Ethernet passive optical network.

2. Description of the Related Art

A passive optical network is a subscriber network that forms a tree-structured distributed topology by connecting a plurality of optical network units (ONUs) to one optical line terminal (OLT) using a 1×N optical distribution network (ODN). The ITU-T (International Telecommunications Union—Telecommunication Standardization Sector) has recently published ITU-T G.982, ITU-T G.983.1 and ITU-T G.983.3, all of which describe an asynchronous transfer mode-passive optical network (ATM-PON) standard. In addition, IEEE 802.3ah TF organized by IEEE (Institute of Electrical and Electronics Engineers) has been working toward standardization for a gigabit Ethernet-based passive optical network system.

In ATM-PON and Ethernet passive optical network systems discussed in the standardization organizations such as ITU-T and IEEE 802.3, transmission capacity depends on a format of data carried on two different wavelengths between an OLT and an ONU. That is, the international standardization organizations of ITU-T and IEEE 802.3 have been discussing a transmission method in which an ATM cell or an Ethernet frame is carried on a 1,550 nm- or 1,490 nm-wavelength signal for downstream transmission from an OLT of the telephone office side to an ONU of the subscriber side, and data is carried on a 1,310 nm-wavelength signal for upstream transmission from an ONU of the subscriber side to an OLT of the telephone office side.

Standardization of a point-to-point gigabit Ethernet and a medium access control (MAC) technology for ATM-PON has already been completed and is disclosed in IEEE 802.3z and ITU-T G.983.1. MAC technology for ATM-PON is also discussed in U.S. Pat. No. 5,978,374, issued to Ghaibeh et al., on Nov. 2, 1999, entitled "Protocol for Data Communication over a Point-to-Multipoint Passive Optical Network."

FIG. 1 illustrates a known configuration of an 802.1D bridge in an Ethernet system. Referring to FIG. 1, since an Ethernet medium is a shared medium in accordance with 802.1D, an Ethernet frame transmitted from a subscriber terminal belonging to a particular region connected to a bridge is transmitted to all subscriber terminals in other regions connected to the bridge.

To reduce traffic and consequent collisions, the bridge can be subject to a table-based learning process; Upon receiving a frame, the bridge stores in an address table a source address of the received frame and an identifier of the port from which the frame was received. Through this process, the bridge progressively learns which addresses are assigned to respective ports. Upon receiving a frame after the learning, the bridge transmits the received frame only to the port assigned a destination address of the frame, and does not transmit the received frame to other ports, thereby mitigating the advent of collision in the shared medium.

If the bridge fails to detect a destination port, i.e., either the received frame has no destination or a port for a destination address of the received frame has never been learned, the bridge transmits the received frame to all ports except a source port from which the frame is received. Transmission to the source port is unnecessary, since terminals on the source port have already received the frame on a "broadcast and select" basis in light of characteristics of the Ethernet. Likewise, if the address table has a destination port for the received frame, but the destination port is the same as the source port, the bridge discards the frame. Thus, for example, the bridge in FIG. 1 discards an Ethernet frame from subscriber terminal A to subscriber terminal B since both terminals belong to the same region and are therefore connected to the bridge by the same port.

FIG. 2 illustrates a known Ethernet—passive optical network with an 802.1D L2 (Layer 2) switch, which can, in conjunction with a L3 (Layer 3) router, be utilized in place of an 802.1D bridge according to the prior art, and FIG. 3 illustrates a format of a standard Ethernet frame. The Ethernet passive optical network includes an optical line terminal (OLT) 110, an optical distribution network (ODN) 120, and optical network units (ONUs) 131-133.

The OLT 110 accesses data of each of the ONUs 131-133 by time division multiplexing (TDM). The OLT 110 includes an L2 switch, and transmits frames received from the ONUs 131-133 by matching corresponding addresses to corresponding ports. In a learning process that occurs during initialization, the L2 switch learns MAC addresses assigned to respective ports while storing in an address table a source address (SA) of a frame received at a particular port. In this case, MAC addresses of the ONUs 131-133 are used as the source addresses or the destination addresses (DA). Upon receiving a frame after the address learning process, the L2 switch transmits the received frame only to the port where a destination address of the frame is assigned, using a static filtering entry (see IEEE 802.1d clause 7.9.1).

As with the bridge of the previous example, the switch discards any frame whose source port is identical to its destination port. Therefore, any frame whose destination port is identical to its source port is discarded by the bridge or L2 switch without being transmitted downstream, even if that frame must be subject to upstream transmission to the bridge or L2 switch and subsequent downstream transmission through the same port.

SUMMARY OF THE INVENTION

The present invention provides for an Ethernet passive optical network configured with an L2 switch or bridge an Ethernet frame format that supports subscriber-to-subscriber communication, multiple subscribers or multiple services and selectively supports QoS (Quality of Service). In another aspect, the present invention features a point-to-point emulation method for use with the inventive frame format on the network.

A point-to-point emulation method for operating an Ethernet passive optical network in accordance with the present invention has one optical line terminal (OLT), a plurality of optical network units (ONUs) each connected to the OLT. A tag or augmented Ethernet frame transmitted between the OLT and the ONUs includes a destination address (DA) field representing a destination address, a source address (SA) field representing a source address, and an LLID field in which a unique LLID assigned to an object of the ONU side is recorded. According to the method, LLIDs are assigned on a one-to-one basis to ports of a bridge or an L2 (Layer 2) switch or similar structure of the OLT side. Upon receiving the augmented Ethernet frame, the OLT outputs an LLID field-deleted Ethernet frame to the bridge or L2 switch port to which the unique LLID is assigned. The bridge or the L2 switch transmits the Ethernet frame to the destination port to which a previously learned destination address is assigned. The OLT regenerates an augmented Ethernet frame by inserting into the LLID field-deleted Ethernet frame an LLID field in which an LLID of a destination ONU is recorded. The regenerated augmented Ethernet frame is transmitted to the destination ONU.

BRIEF DESCRIPTION OF THE DRAWINGS

The above and other aspects, features and advantages of the present invention will become more apparent from the following detailed description when taken in conjunction with the accompanying drawings in which same or similar elements are denoted by the same reference numerals throughout the several views:

FIG. 3 illustrates a format of a standard Ethernet frame;

FIG. 4 illustrates an exemplary format of a tag Ethernet frame according to a first embodiment of the present invention;

DETAILED DESCRIPTION OF THE PREFERRED EMBODIMENT

Figure 1:
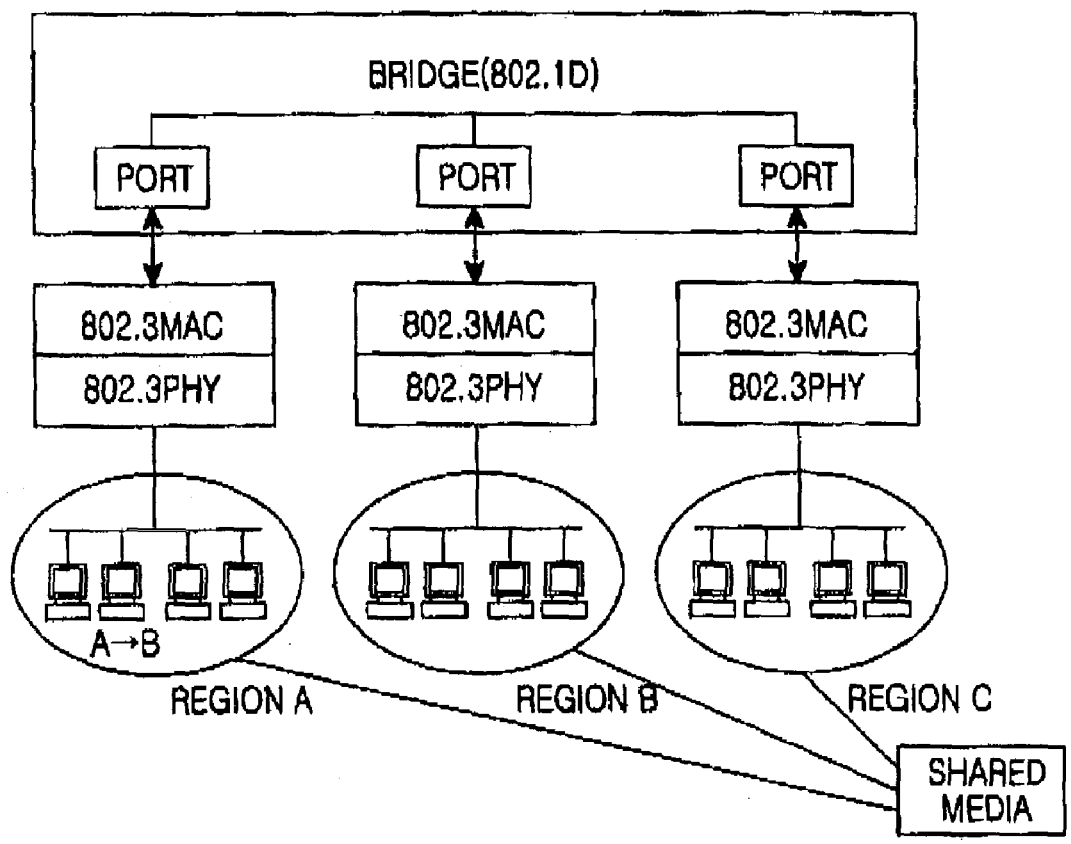
FIG. 1 illustrates a relationship between the 802.3 Ethernet protocol and an 802.1D bridge according to the prior art.
Figure 2:
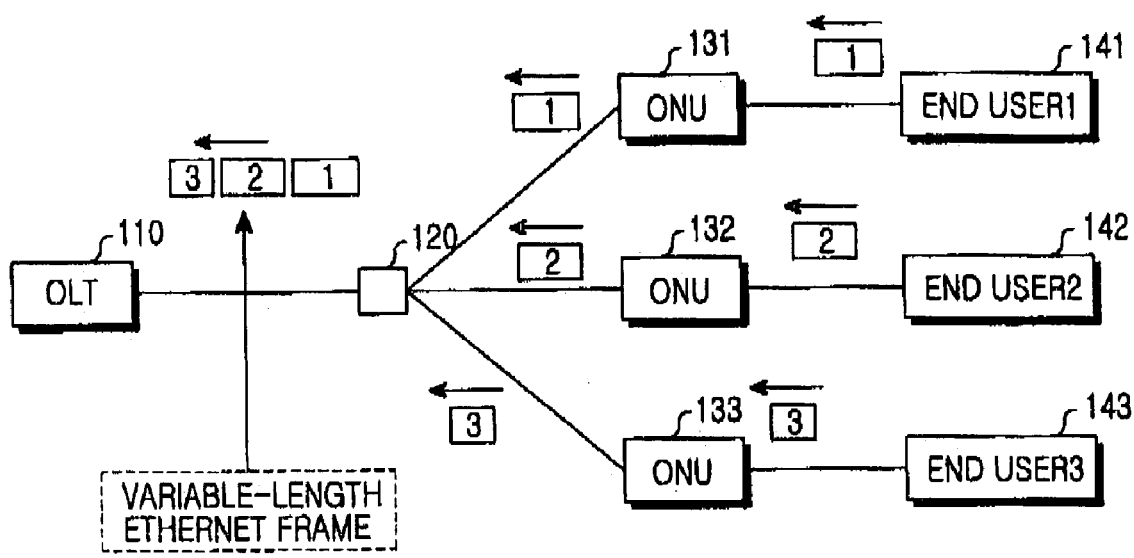
FIG. 2 illustrates an Ethernet passive optical network with an L2 switch according to the prior art.

Several preferred embodiments of the present invention will now be described in detail with reference to the annexed drawings.

FIG. 4 illustrates a format of a tag Ethernet frame according to a first embodiment of the present invention. The tag Ethernet frame includes a 6-byte destination address (DA) field 210 indicating a destination address, a 6-byte source address (SA) field 220 indicating a source address, a 2-byte length/Ethernet type (LEN/ETYPE) field 250, a data field 260, and a frame check sequence (FCS) field 270 which constitute the existing or conventional Ethernet frame. Typically, MAC (Medium Access Control) addresses are used as the destination address and as the source address.

The tag Ethernet frame additionally includes an Ethernet type (ETYPE) field 230 and a logical link identifier (LLID) field 240, interposed between the source address field 220 and the length/Ethernet type field 250. The Ethernet type field 230 and the LLID field 240 are inserted using a tagging method when downstream transmission to the ONU side or upstream transmission to the OLT side is performed. The LLID represents a unique identifier (ID) assigned to an object of the ONU side, where each ONU is an object and, likewise, each of one or more service ports or subscriber ports connected to the ONUs is an object. The LLIDs are assigned to ports of a bridge or an L2 switch of the OLT side on a one-to-one basis. The LLID field 240 records the LLID assigned to the sending port of the bridge or the L2 switch, the same LLID that has been assigned to the destination object, during downstream transmission. During upstream transmission, the LLID field 240 records the LLID of the source object on the ONU side, the same LLID that has been assigned to the receiving port of the bridge or L2 switch. The Ethernet type field 230 records a new Ethernet type to distinguish the tag Ethernet frame from the existing Ethernet frame. The tag Ethernet frame is compatible with the existing system, since it can be transmitted to an upper layer after deletion of the LLID field 240 and the Ethernet type field 230.

To deliver the tag Ethernet frame of FIG. 4 to an upper layer at the source or destination, the LLID field 240 is deleted and the Ethernet type field 230 is changed to one of previously defined Ethernet frame types. That is, the Ethernet type field 230 is so compositely defined as to indicate the existing Ethernet frame type and the tag Ethernet frame.

Figure 5:
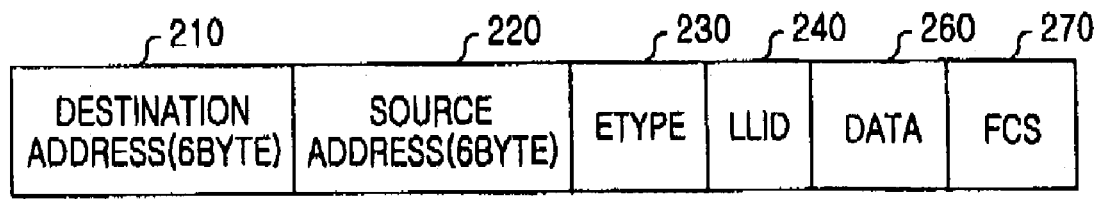
FIG. 5 illustrates an exemplary format of a tag Ethernet frame according to a second embodiment of the present invention.

FIG. 5 illustrates a format of a tag Ethernet frame according to a second embodiment of the present invention, which differs from the first embodiment in that the Len/Etype field 250 is not implemented. The two bytes thereby conserved compensate for storage utilized in augmenting the Ethernet frame with an Ethernet type (ETYPE) field 230 and a logical link identifier (LLID) field 240.

Figure 6:
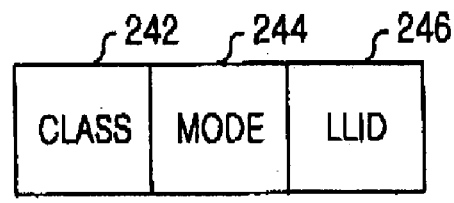
FIG. 6 illustrates an example of a detailed format of the LLID field 240 shown in FIGS. 4 and 5.

FIG. 6 illustrates an example of a detailed format of the LLID field 240 shown in FIGS. 4 and 5. If it is assumed that the LLID field 240 is comprised of 2 bytes, the LLID field 240 may include a 3-bit class 242, a 1-bit mode 244, and a 12-bit LLID 246. The LLID 246 represents a unique ID assigned during registration of an object of the ONU side, i.e., a new ONU, a subscriber port or classified service port.

The class 242 represents a class determined according to SLA (Service Level Agreement) for a subscriber or a type of multiple services supported. Priority can be assigned according to the class 242. For example, priority can be given to a queue of a corresponding port of a bridge or an L2 switch of the OLT side, or top priority can be given to an object on the ONU side during frequency assignment, in order to guarantee high QoS (Quality of Service) while supporting multiple services. Class 242 can also be classified according to a class of SLA for the subscriber. The mode 244 distinguishes a point-to-point link mode P for a transmission frame from a point-to-multipoint broadcast mode B.

Figure 7:
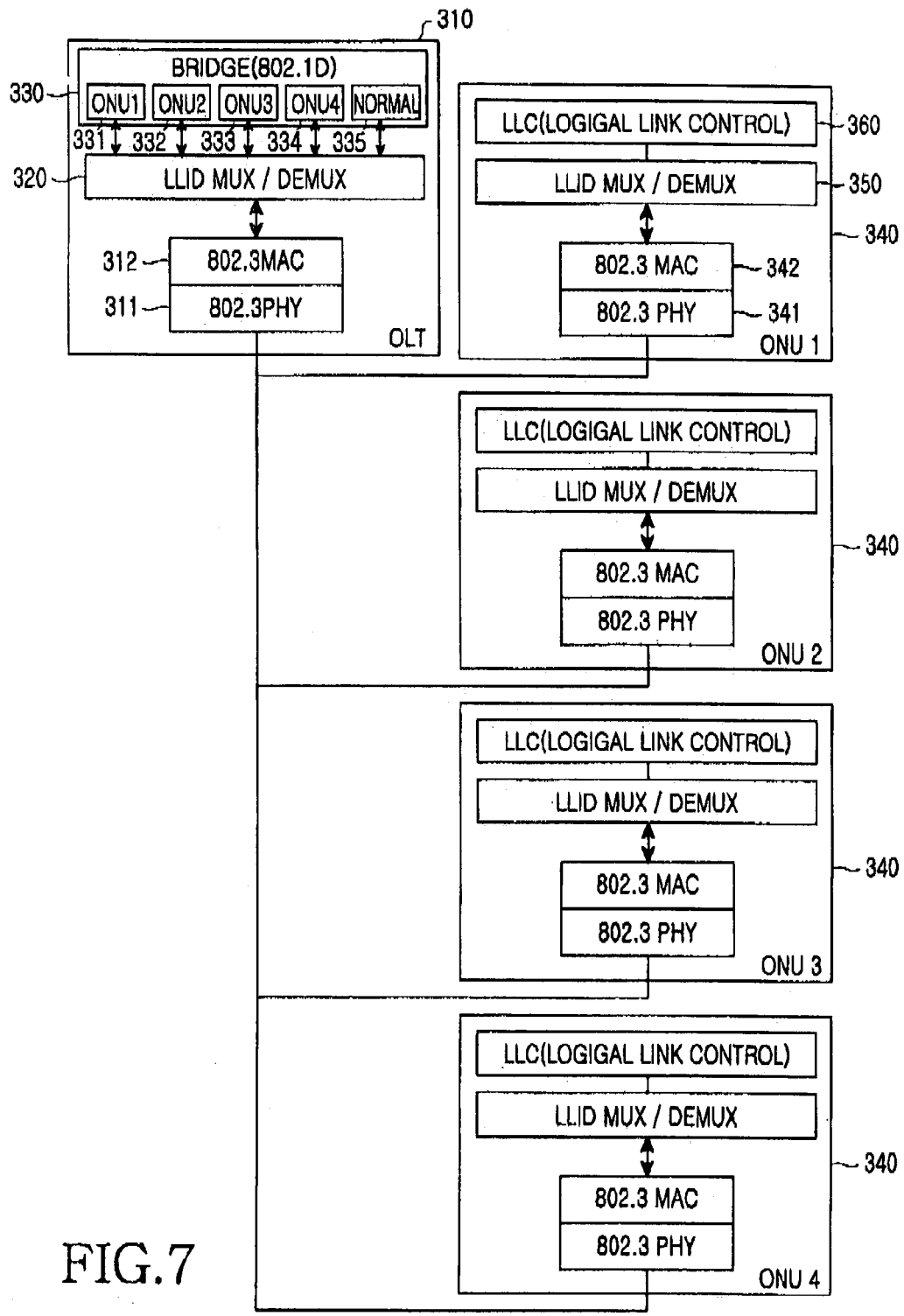
FIG. 7 is a block diagram illustrating a structure of an Ethernet PON according to a third embodiment of the present invention.

FIG. 7 is a block diagram illustrating a structure of an Ethernet PON according to a third embodiment of the present invention. Referring to FIG. 7, the Ethernet PON is comprised of one OLT 310 and a plurality of ONUs 340. The OLT 310 includes an 802.3 physical (PHY) layer 311, an 802.3 MAC layer 312, a bridge 330, and an LLID multiplexer/demultiplexer (MUX/DEMUX) layer 320. The bridge 330 includes ports 331-334 assigned to the ONUs 340 on a one-to-one basis for point-to-point emulation, and a normal port 335 for handling the existing Ethernet frame rather than the tag Ethernet frame. The number of ports of the bridge 330 and the number of the ONUs 340 are variable, where if the number of ONUs 340 is n, the number of ports of the bridge 330 is n+1.

The LLID MUX/DEMUX layer 320 inserts, into an existing Ethernet frame, an Ethernet type field in which a tag Ethernet frame type is recorded and an LLID field in which LLID assigned to a corresponding port of the bridge 330 is recorded, during downstream transmission to the ONUs 340. The LLID MUX/DEMUX layer 320 also determines whether an Ethernet frame received from the ONUs 340 is a tag Ethernet frame.

Each of the ONUs 340 includes an 802.3 PHY layer 341, an 802.3 MAC layer 342, an LLID MUX/DEMUX layer 350, and a logical link control (LLC) layer 360. The LLID MUX/DEMUX layer 350 checks an Ethernet type field of an Ethernet frame received from the OLT 310. If the Ethernet type field indicates a tag Ethernet frame, the LLID MUX/DEMUX layer 350 checks an LLID field and transmits the Ethernet frame to the LLC layer 360 only if the LLID is identical to its own LLID, and discards the other frames whose LLIDs are not identical to its own LLID. During upstream transmission to the OLT 310, the LLID MUX/DEMUX layer 350 inserts, into the existing Ethernet frame, an Ethernet type field in which a tag Ethernet type is recorded and an LLID field in which its own LLID is recorded, to thereby convert the existing Ethernet frame into the tag Ethernet frame.

Figure 8:
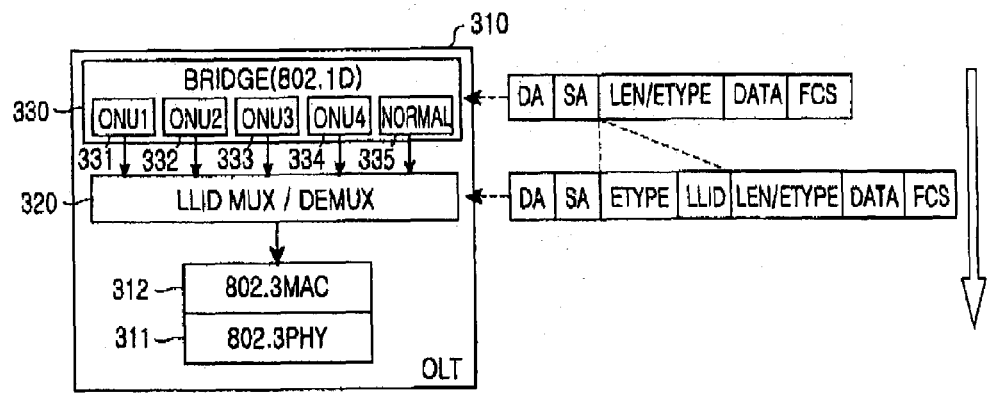
FIG. 8 illustrates a procedure for transmitting an Ethernet frame in a downstream direction in the Ethernet PON of FIG. 7.

FIG. 8 illustrates a procedure for transmitting an Ethernet frame in a downstream direction in the Ethernet PON of FIG. 7. Upon receiving an Ethernet frame, the bridge 330 of the OLT 310 analyzes a destination address of the received Ethernet frame, and provides the Ethernet frame to the LLID MUX/DEMUX layer 320 through a port 331-335 of the bridge 330 to which the destination address is assigned. The LLID MUX/DEMUX layer 320 converts an existing Ethernet frame to a tag Ethernet frame by inserting into the existing Ethernet frame an Ethernet type field in which a tag Ethernet type is recorded and an LLID field in which an LLID assigned to a corresponding port of the bridge 330, at which the Ethernet frame is received, is recorded.

Figure 9:
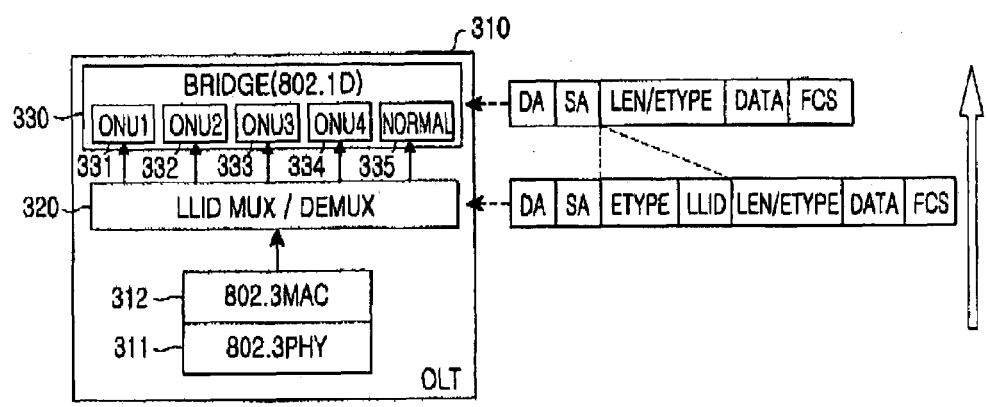
FIG. 9 illustrates a procedure for handling an upstream Ethernet frame received at the OLT in the Ethernet PON of FIG. 7.

FIG. 9 illustrates a procedure for handling an upstream Ethernet frame received at the OLT in the Ethernet PON of FIG. 7. The upstream Ethernet frame is applied to the LLID MUX/DEMUX layer 320 through the 802.3 PHY layer 311 and the 802.3 MAC layer 312. If the tag Ethernet frame type was recorded in the Ethernet type field of a received Ethernet frame, the LLID MUX/DEMUX layer 320 determines a corresponding port of the bridge 330 by analyzing the LLID field, deletes the Ethernet type field and the LLID field, and recalculates FCS, thereby restoring the received Ethernet frame to an existing Ethernet frame. The LLID MUX/DEMUX layer 320 provides the restored or regenerated existing Ethernet frame to the bridge 330 through the corresponding port 331-334. In contrast, however, if the existing Ethernet frame type was recorded in the Ethernet type field of a received Ethernet frame, the LLID MUX/DEMUX layer 320 delivers the Ethernet frame intact to the bridge 330 through the normal port 335.

Figure 10:
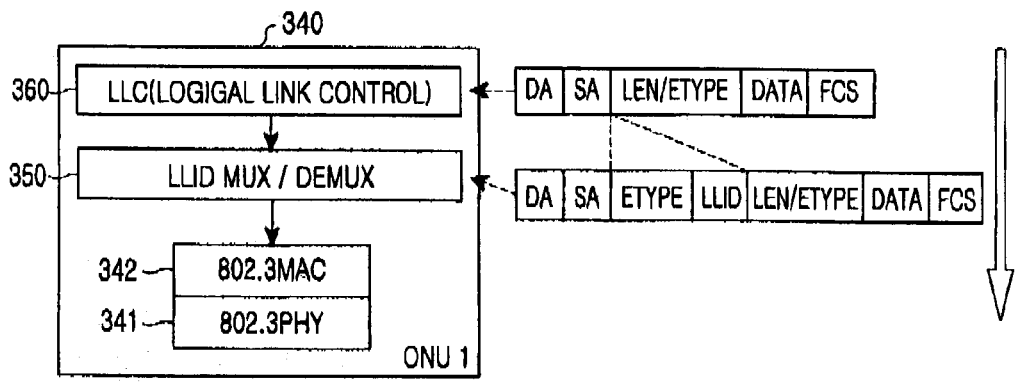
FIG. 10 illustrates a procedure for transmitting an Ethernet frame in an upstream direction in the Ethernet PON of FIG. 7.

FIG. 10 illustrates a procedure for transmitting an Ethernet frame in an upstream direction in the Ethernet PON of FIG. 7. If the LLC layer 360 transmits an Ethernet frame to the LLID MUX/DEMUX layer 350, the LLID MUX/DEMUX layer 350 inserts, into the existing Ethernet frame, an Ethernet type field in which the tag Ethernet frame type is recorded and an LLID field in which its own LLID is recorded.

Figure 11:
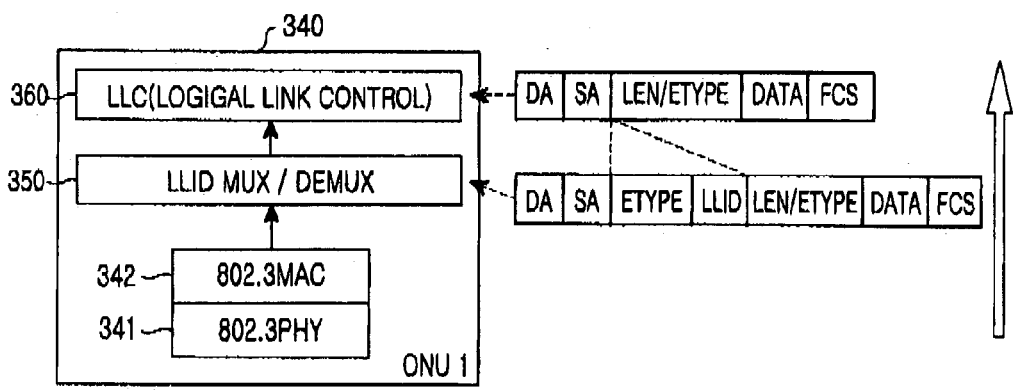
FIG. 11 illustrates a procedure for handling a downstream Ethernet frame received at the ONU in the Ethernet PON of FIG. 7.

FIG. 11 illustrates a procedure for handling a downstream Ethernet frame received at the ONU in the Ethernet PON of FIG. 7. The downstream Ethernet frame is applied to the LLID MUX/DEMUX layer 350 through the 8023 PHY layer 341 and the 802.3 MAC layer 342 of the ONU 340. The LLID MUX/DEMUX layer 350 first examines the Ethernet type field. As a result of the examination, if the Ethernet type field indicates a tag Ethernet frame, the LLID MUX/DEMUX layer 350 analyzes the LLID field, to thereby transmit to the LLC layer 360 the Ethernet frame only if the LLID is identical to its own LLID and to otherwise discard the frame. The LLID MUX/DEMUX layer 350 also restores the existing Ethernet frame by deleting the Ethernet type field and the LLID field and recalculating FCS, and then transmits the restored Ethernet frame to the LLC layer 360. In contrast, however, if the existing Ethernet frame type was recorded in the Ethernet type field of a received Ethernet frame, the LLID MUX/DEMUX layer 350 transmits the Ethernet frame intact to the LLC layer 360.

Figure 12:
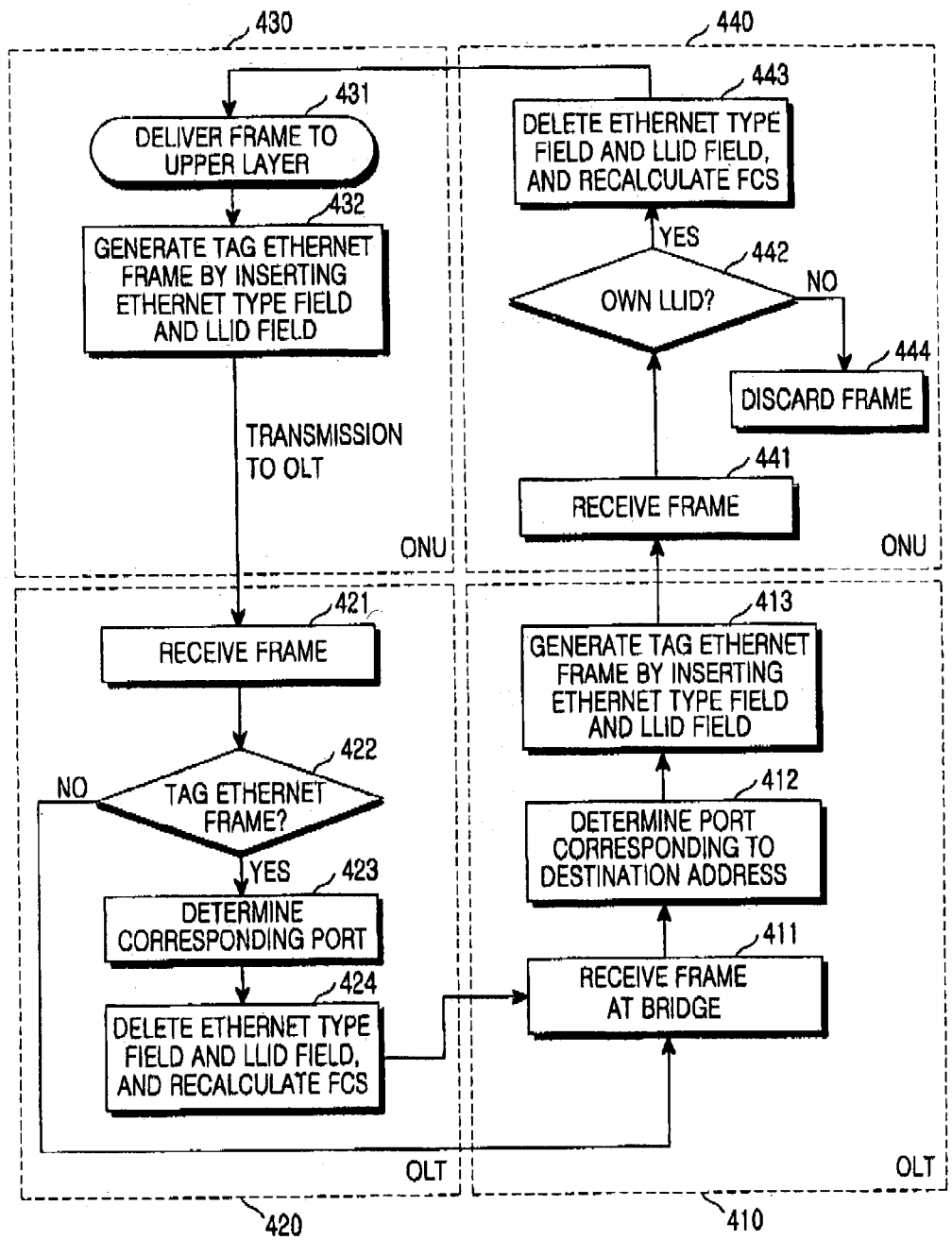
FIG. 12 is a flowchart illustrating procedures for transmitting/receiving upstream/downstream Ethernet frames in the Ethernet PON of FIG. 7.

FIG. 12 is a flowchart illustrating procedures for transmitting/receiving upstream/downstream Ethernet frames based on the structures depicted in FIGS. 8 to 11, and specifically for the case in which a particular ONU transmits an Ethernet frame to another ONU in the Ethernet PON of FIG. 7. Reference numerals 410, 420, 430 and 440 denote processes that correspond to the above discussion of FIGS. 8 to 11, respectively.

If the LLC layer 360 of the ONU 340 transmits an Ethernet frame to the LLID MUX/DEMUX layer 350 (Step 431), the LLID MUX/DEMUX layer 350 inserts, into an existing Ethernet frame, an Ethernet type field in which a tag Ethernet frame type is recorded and an LLID field in which its own LLID is recorded (Step 432). The LLID MUX/DEMUX layer 350 then transmits a tag Ethernet frame to the OLT 310 in an upstream direction.

Upon receiving the tag Ethernet frame (Step 421), the LLID MUX/DEMUX layer 320 of the OLT 310 determines whether a tag Ethernet frame type is recorded in the Ethernet type field (Step 422). If so, the LLID MUX/DEMUX layer 320 determines a corresponding port of the bridge 330 by examining the LLID field (Step 423). The LLID MUX/DEMUX layer 320 thereafter deletes the Ethernet type field and the LLID field from the Ethernet frame, recalculates FCS (Step 424), and then transmits the resulting Ethernet frame to the bridge 330 through a corresponding port.

After receiving the Ethernet frame (Step 411), the bridge 330 determines a destination address of the Ethernet frame and transmits the Ethernet frame to the LLID MUX/DEMUX layer 320 through the particular one of the ports 331-335 that corresponds to the destination address (Step 412). The LLID MUX/DEMUX layer 320 inserts, into the existing Ethernet frame, an Ethernet type field in which a tag Ethernet frame type is recorded and an LLID field into which is recorded the LLID assigned to that particular port (Step 413). The resulting Ethernet frame is then transmitted to the ONU 340 in a downstream direction.

Upon receiving the Ethernet frame from the OLT 310 (Step 441), the LLID MUX/DEMUX layer 350 of the ONU 340 determines whether a tag Ethernet frame type is recorded in the Ethernet type field (Step 442). If so, the LLID MUX/DEMUX layer 350 analyzes an LLID field to determine if the LLID is identical to its own LLID. If they are identical, the LLID MUX/DEMUX layer 350 deletes the Ethernet type field and the LLID field and recalculates FCS (Step 443). The LLID MUX/DEMUX layer 350 then transmits the resulting Ethernet frame to the LLC layer 360. However, the LLID MUX/DEMUX layer 250 discards a tag Ethernet frame whose LLID is not identical to its own LLID (Step 444).

Figure 13:
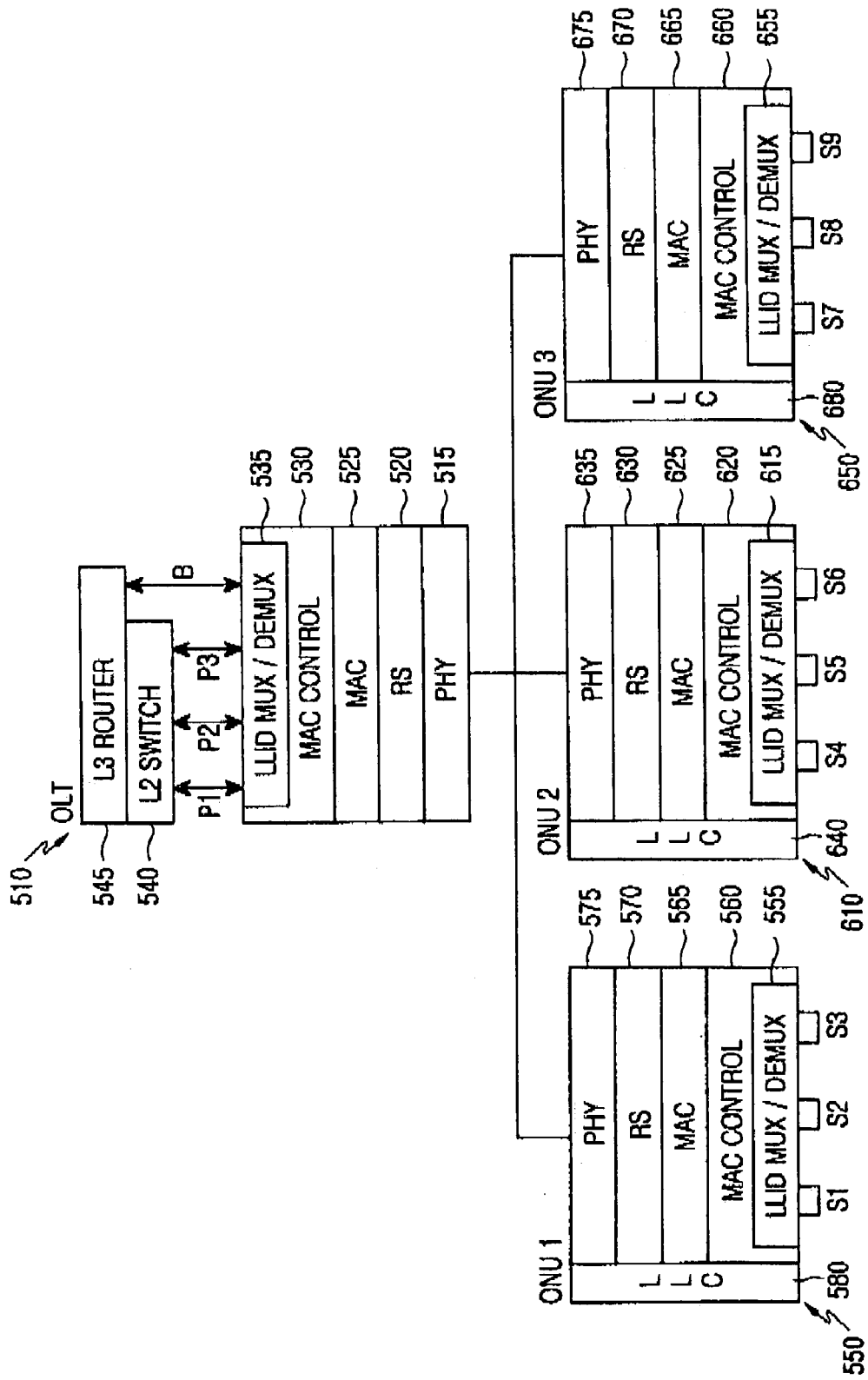
FIG. 13 is a block diagram illustrating a structure of an Ethernet PON according to a fourth embodiment of the present invention.

FIG. 13 is a block diagram illustrating a structure of an Ethernet PON according to a second embodiment of the present invention. The Ethernet PON is comprised of one OLT 510 and a plurality of ONUs 550, 610, 650, all of which are connected to the OLT 510 in a tree structure.

Referring to FIG. 13, each of the ONUs 550, 610, 650 includes one or more of service ports or subscriber ports S1-S9. Each of the subscriber/service ports S1-S9 is assigned a unique LLID. The LLID assignment can be performed in an initial registration process, and the OLT 510 assigns an LLID to an object of the ONU side, i.e., a new ONU, while a subscriber port or classified service port is registered. When such ONU, subscriber port or classified service port is deregistered as a cold ONU or cold port, the LLID assigned thereto is released and reused when a new ONU or subscriber/service port is registered. The LLIDs are assigned to ports of an L2 switch 540 on a one-to-one basis.

During upstream transmission to the OLT 510, LLID MUX/DEMUX layers 555, 615, 655 of the ONUs 550, 610, 650 insert an Ethernet type field, in which a tag Ethernet frame type is recorded and an LLID field in which their own LLIDs are recorded, into existing Ethernet frames generated by LLC layers 580, 640, 680, and then transmit the resulting tag Ethernet frames. The tag Ethernet frames are transmitted to the OLT 510 in an upstream direction through PHY layers 575, 635, and 675. An LLID MUX/DEMUX layer 535 of the OLT 510 checks an LLID of the received tag Ethernet frame, deletes an Ethernet type field and an LLID field from the tag Ethernet frame, and transmits the resulting Ethernet frame to the port P1-P3 of the L2 switch 540, to which the LLID is assigned. The L2 switch 540 analyzes a destination address through an address learning process, and then transmits the Ethernet frame to the assigned port.

The Ethernet frame is transmitted to the ONUs 550, 610, 650 in a downstream direction. The LLID MUX/DEMUX layer 535 of the OLT 510 inserts, into the existing Ethernet frame, an Ethernet type field in which a tag Ethernet frame type is recorded and an LLID field in which an LLID assigned to the destination address is recorded, and then transmits the resulting Ethernet frame to the ONUs 550, 610, 650 in a downstream direction. Upon receiving the downstream Ethernet frame, each of LLID MUX/DEMUX layers 555, 615, 655 of the ONUs 550, 610, 650 determines whether the received Ethernet frame is a tag Ethernet frame. If so, the LLID MUX/DEMUX layer determines whether the LLID of the Ethernet frame is identical to its own LLID before deleting an LLID field. If the LLID is identical to its own LLID, the LLID MUX/DEMUX layer transmits the Ethernet frame through a corresponding one of the subscriber/service ports S1 to S9. Otherwise, if the LLID is not identical to its own LLID, the LLID MUX/DEMUX layer discards the Ethernet frame.

Determining whether the Ethernet frame is used for broadcast can be achieved by examining the mode 242 of FIG. 6. In the case of a point-to-multipoint mode B, the Ethernet frame is directly transmitted from the LLID MUX/DEMUX layer 535 of the OLT 510 to an L3 router 545 without passing through the L2 switch 540, and then routed by the L3 router 545 and transmitted to the ONUs 550, 610, 650. Bypassing the L2 switch avoids multiple broadcasts, where the frame is transmitted to all ports except the one from which the switch received the frame, which would include the ports of all of the other L2 switches on the L3 router.

Prior to transmitting the frame to the ONUs 550, 610, 650, the LLID MUX/DEMUX layer 535 inserts, into the existing Ethernet frame, a default LLID field designated for broadcast or an LLID field in which an LLID of the OLT 510 is recorded. The resulting Ethernet frame, in being transmitted in a downstream direction, is broadcasted to each of the ONUs 550, 610, 650. Each of the LLID MUX/DEMUX layers 555, 615, 655 of the ONUs 550, 610, 650 recognizes the received Ethernet frame as a broadcast frame by examining the mode, and deletes the LLID field from the received Ethernet frame since an LLID of the received Ethernet frame is not identical to its own LLID, and then transmits the resulting Ethernet frame to an upper layer.

A determination as to whether the received Ethernet frame is a tag Ethernet frame can be performed by a layer other than the MAC layers 565, 625, 665, in which case only the LLID field is delivered to the MAC layers 565, 625, 665.

As described above, the present invention enables peer-to-peer transmission without modification of an existing 802.1D bridge by providing a tag Ethernet frame for securing 802.1D bridge compatibility with an Ethernet passive optical network, and a point-to-point emulation method. In addition, the present invention enables not only ONU-to-ONU communication but also subscriber-to-subscriber communication in the L2 switch. Furthermore, the present invention can support multiple services by assigning LLIDs to service ports according to service types and realizing a point-to-point emulation technique for the service ports. In addition, it is possible to specify class according to the SLA of the subscriber or a type of the multiple services. It is possible to guarantee QoS during multiple services or enable accounting according to the SLA by giving priority according to class.

While the invention has been shown and described with reference to a certain preferred embodiment thereof, it will be understood by those skilled in the art that various changes in form and details may be made therein without departing from the spirit and scope of the invention as defined by the appended claims. For example, the bridge can be configured separate from rather than part of the OLT.

What is claimed is:

1. A point-to-point emulation method for operating an Ethernet passive optical network having an optical line terminal (OLT), a plurality of optical network units (ONUs) each connected to the OLT, an ONU side comprising said plurality, and an OLT side comprising said OLT, wherein an augmented Ethernet frame transmitted between the OLT and the ONUs includes a destination address (DA) field representing a destination address, a source address (SA) field representing a source address, and a logical link identifier (LLID) field in which a unique LLID assigned to a respective object of the ONU side and an updated Ethernet type field identifying that the Ethernet frame has been augmented are recorded, the method comprising the steps of:

assigning, on a one-to-one basis, LLIDs to ports of a structure comprising one of a bridge and an L2 (Layer 2) switch of the OLT side;

learning which of the ports is a source port of a source address of the L2 switch of the OLT side;

converting an existing Ethernet frame into the augmented Ethernet frame for transmission between the OLT and ONUs:

upon receiving the augmented Ethernet frame, deleting, by the OLT, the LLID field contained in the augmented Ethernet frame and outputting an LLID field-deleted Ethernet frame to a structure port to which said unique LLID is assigned;

transmitting, by said structure, the LLID field-deleted Ethernet frame to said source port;

wherein during downstream transmission, the existing Ethernet frame is converted into an augmented Ethernet frame by inserting, by the OLT, the LLID field into the LLID field-deleted Ethernet frame in which an LLID of a destination ONU is recorded, updating the Ethernet type field in which an augmented Ethernet frame type is recorded, and regenerating the augmented Ethernet frame; and transmitting the regenerated augmented Ethernet frame to the destination ONU; and wherein during an upstream transmission to the OLT, the existing Ethernet frame is converted into an augmented Ethernet frame by inserting, by a source ONU, in the Ethernet type field in which an augmented Ethernet type is recorded and an LLID field in which the source ONU's own LLID is recorded.

2. The method of claim 1, wherein the learning step comprises the substeps of:

upon receiving an unlearned Ethernet frame, outputting, by the OLT, an LLID field-deleted unlearned Ethernet frame to said structure port to which a corresponding LLID is assigned; and determining, by said structure, a medium access control (MAC) address of the LLID field-deleted unlearned Ethernet frame.

3. The method of claim 1 further comprising:

upon receiving the augmented Ethernet frame, checking, by a receiving ONU, said unique LLID; and discarding, by said receiving ONU, the augmented Ethernet frame if said unique LLID is not identical to an LLID exclusively assigned to said receiving ONU; and restoring, by said receiving ONU, the existing Ethernet frame by deleting the Ethernet type field and the LLID field and recalculating a frame check sequence (FCS).

4. The method of claim 3, wherein the LLID field comprises:

an LLID representing a unique ID assigned to an object of the ONU;

a class representing a class determined according to a type of a service supported; and a mode for distinguishing a point-to-point mode from a point-to-multipoint broadcast mode.

5. A system for operating an Ethernet passive optical network, the system comprising:

an optical line terminal (OLT) having a structure that includes at least one of a bridge and L2 (Layer 2) switch and that includes multiple ports, the OLT including a multiplexer/demultiplexer (mux/demux) configured to multiplex the ports;

a plurality of optical network units (ONUs) containing at least one ONU port, each ONU having a mux/demux to which at least one ONU port is multiplexed; and a line configured to connect and transmit multiplexed input from either of the mux/demuxes to the other mux/demux;

wherein each of the ports included in the structure of the OLT, ONUs, and ONU ports is assigned an LLID of a set of LLIDs, wherein a source ONU is configured to, during an upstream transmission to the OLT, convert the existing Ethernet frame into an augmented Ethernet frame by inserting the Ethernet type field in which an augmented Ethernet type is recorded and an LLID field in which the source ONU's own LLID is recorded; and wherein said OLT is configured to, during upstream transmission, receive the augmented Ethernet frame, to determine if the frame received by the structure has been augmented, and to delete the LLID from the frame received by the OLT and change the Ethernet type field to a previously-defined Ethernet frame type if the frame has been augmented, wherein said OLT is configured to, during downstream transmission, insert the LLID into a non-augmented Ethernet frame, update the Ethernet type field, and to transmit the Ethernet frame containing the LLID of at least one of the plurality of ONUs and ONU ports, and wherein at least one of the plurality of ONUs and ONU ports is configured to receive the augmented Ethernet frame and to discard, upon receipt, the augmented Ethernet frame if the contained LLID is not identical to an LLID assigned to said at least one of the plurality of ONUs and ONU ports.

6. The system of claim 5, wherein one of the plurality of ONUs is configured to perform said discarding and is further configured to delete the LLID from the augmented Ethernet frame if the frame has been augmented.

7. The system of claim 5, wherein said structure includes said L2 switch, the OLT further including an L3 router.

8. The system of claim 7, wherein the Ethernet frame has been further augmented to include a mode field that indicates a mode of operation of the system, the mode being selectable at least between point-to-point mode and point-to-multipoint mode.

9. The system of claim 8, wherein the OLT is configured to bypass the L2 switch in point-to-multipoint mode.

10. The system of claim 9, wherein the Ethernet frame bypasses the L2 switch enroute from the OLT mux/demux to the L3 router in point-to-multipoint mode.

11. The system of claim 7, wherein the OLT further includes a port between the L3 router and the OLT mux/demux, the port being configured to transmit Ethernet frames that have not been augmented to contain an LLID.

12. The system of claim 11, wherein the non-augmented frames are conventional Ethernet frames.

13. The system of claim 8, wherein the Ethernet frame has been further augmented to include a class field representing a class determined according to a type of a service supported.

14. The system of claim 5, wherein the OLT further includes a port between said structure and the OLT mux/demux, the port being configured to transmit Ethernet frames that have not been augmented to contain an LLID.

15. The system of claim 14, wherein the non-augmented frames are conventional Ethernet frames.

16. The system of claim 5, wherein said structure further includes a table being configured to map said multiple ports to LLIDs of said set.

17. The system of claim 16, wherein said structure updates the table in a learning process.

18. The system of claim 17, wherein the learning process is responsive to Ethernet frames received by said structure.

* * * * *